Aug. 9, 1960     F. O. E. SCHULTZ     2,948,549
FLUID SUSPENSION SYSTEM FOR VEHICLES
Filed Oct. 11, 1957     3 Sheets-Sheet 1
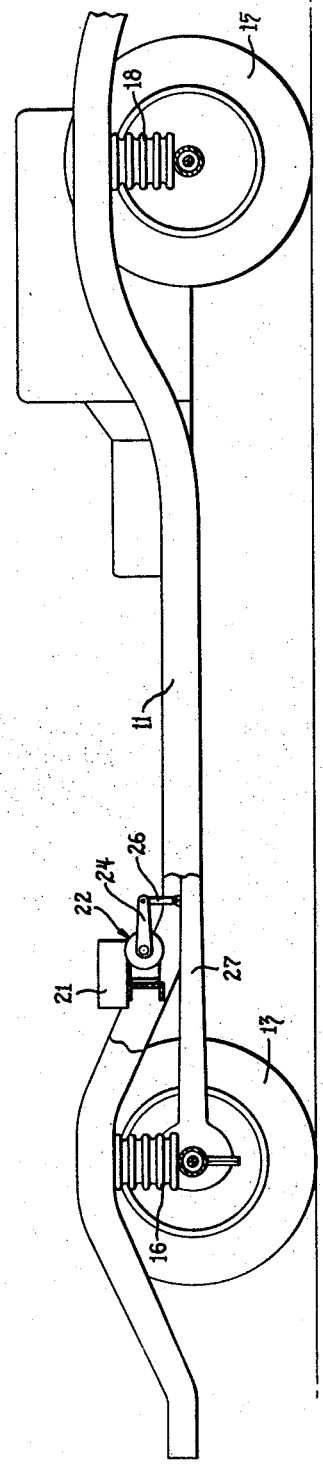
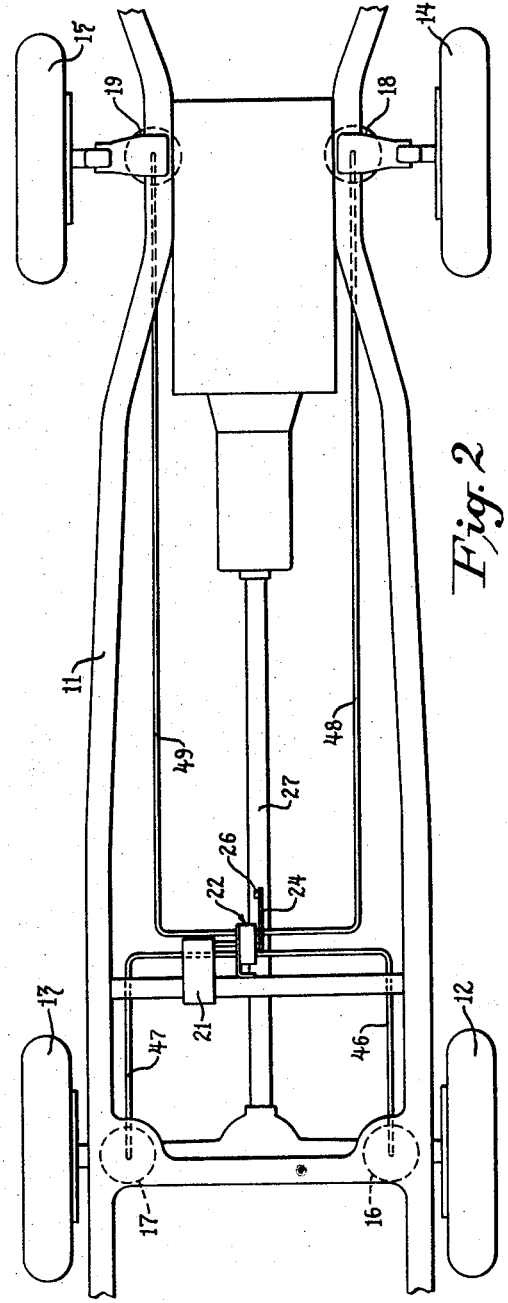
INVENTOR.
FORREST O.E. SCHULTZ
BY Irwin L. Groh
ATTORNEY.

Aug. 9, 1960  F. O. E. SCHULTZ  2,948,549
FLUID SUSPENSION SYSTEM FOR VEHICLES
Filed Oct. 11, 1957  3 Sheets-Sheet 3

INVENTOR.
FORREST O. E. SCHULTZ
BY
ATTORNEY.

United States Patent Office 2,948,549
Patented Aug. 9, 1960

2,948,549

FLUID SUSPENSION SYSTEM FOR VEHICLES

Forrest O. E. Schultz, Owosso, Mich., assignor to Midland-Ross Corporation, a corporation of Ohio Filed Oct. 11, 1957, Ser. No. 689,611

11 Claims. (Cl. 280—124)

This invention relates to fluid suspension systems and in particular to an air suspension system for vehicles.

In suspending a vehicle body from ground engaging wheels it is desirable to maintain equal spring rates at all of the springs so that the vehicle will not sway on curves or on slippery roads upon changes in static and dynamic vehicle loading.

Mechanical springs presently used tend to achieve this result since their rates are constant, that is, a unit load will result in a unit of deflection so that as the load doubles the deflection doubles. Consequently, when the vehicle load is abnormally unbalanced the rates at all the springs remain equal to each other. However, the variation in the deflections caused by the unbalanced load results in a large degree of tilting of the suspended body relative to a plane passing through the axles of all the wheels. Also, since the spring rates remain the same whether or not the vehicle is loaded it is necessary to provide a large range of deflection to accommodate a large range of loads.

With an air spring, which may be considered as a load supporting air container, an increased load results in an increased pressure in the container and each unit of additional load results in a smaller increment of deflection. Because of this, the spring rate increases as the load increases and an unevenly loaded vehicle body suspended by air springs will not tilt to the same degree as the same vehicle body under the same load when the vehicle is equipped with mechanical springs. The present trend in air suspension systems is to provide the air springs associated with the front axle of the vehicle with one control mechanism and to use a separate control mechanism for each spring associated with the rear axle. The control mechanisms operate to maintain the vehicle body level or equally spaced from opposite ends of the rear axle by supplying or exhausting air. In other words, when a load is placed at one side of the vehicle, additional air is supplied to the air springs on the loaded side to raise that portion of the vehicle body to the same height as the other body portions. Such systems are called leveling systems and have been successful from the standpoint of maintaining a level body condition or a uniform spacing between the wheels and the adjacent body portions even under unbalanced loading conditions. However, the spring rate of an air spring is a function of the air pressure contained in the spring and when the spring air pressures vary the spring rates vary and present a hazardous condition on curves or slippery roads. Furthermore, a plurality of control mechanisms are required which makes for a duplication of equipment adding to cost and service problems.

Since air springs deflect less under large loads than a mechanical spring it is believed that the leveling feature commonly used in air suspension systems is not so critical as the need for equal spring rates at all of the air springs.

It is, therefore, a general object of this invention to provide a suspension system which incorporates the advantage of both mechanical and air spring suspension systems and at the same time minimizes the disadvantage of such systems.

It is another object of the invention to provide a fluid suspension system in which the spring rates of all of the suspension units are maintained equal even under unbalanced load conditions.

It is another object of the invention to provide a fluid suspension system in which the rates of the various fluid springs vary directly with changes in load and in the distribution of the load.

Still another object of the invention is to provide a fluid suspension system in which a single control mechanism is centrally located to respond to changes in the position between sprung and unsprung portions of the vehicle to reflect changes in load and in the balancing of the load.

An additional object of the invention is to provide a fluid suspension system in which fluid pressures in the various suspension units are equalized upon relative motion of sprung and unsprung portions of the vehicle to maintain equal spring rates and in which the pressures are increased equally to increase the rate of all the springs upon an increase in the load on the vehicle whether that load is balanced or unbalanced.

The foregoing and other objects and advantages are attained by the present invention, various novel features of which will be apparent from the following description and from the accompanying drawings disclosing a preferred embodiment of the invention.

Referring to the drawings:

Fig. 1 is a side elevation of an automobile chassis embodying the suspension system of the present invention, the rear wheels being removed for the purpose of better disclosure;

Fig. 2 is a plan view of the arrangement shown in Fig. 1;

Figure 3:
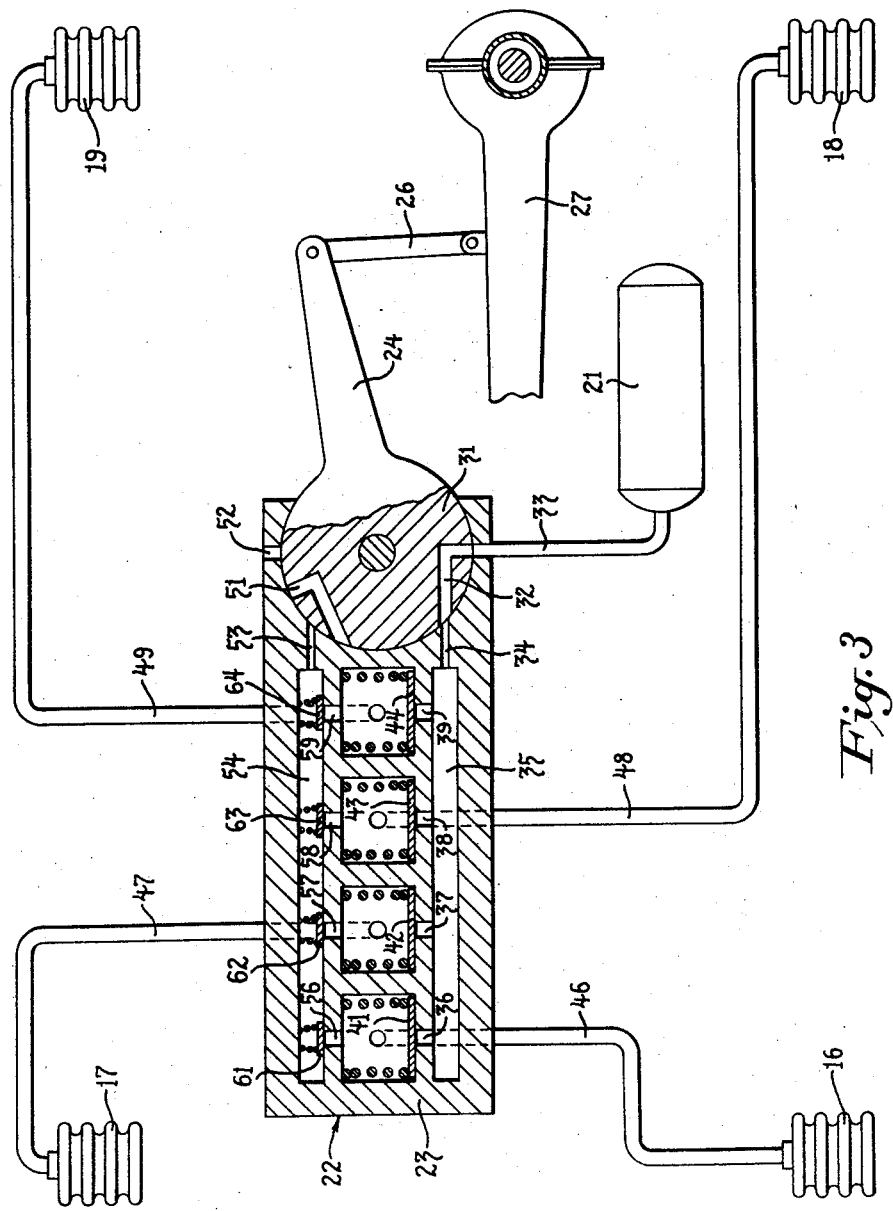
Fig. 3 is a diagrammatic view illustrating the control mechanism and the air springs of the present suspension system.

A general arrangement of a preferred embodiment of the invention is illustrated in Figs. 1 and 2 in which an automobile frame 11 is supported relative to rear drive wheels 12 and 13 and front dirigible wheels 14 and 15 by means of load supporting fluid containers or air springs 16—19. The air springs may be of conventional bellows type which expand and contract, depending upon the load they support and on the volume and pressure of the air which they contain. A source of air for the springs is afforded by a tank or reservoir 21 which is supplied by air under pressure in a conventional manner from a compressor (not shown). Delivery of air from the reservoir to the springs is regulated by a control mechanism 22 including a body member 23 mounted on frame 11 and a movable lever 24 connected through a link 26 to a drive shaft housing 27. Any variation in load on the frame 11 will be effective to change the deflection of one or more of the air springs 16, 17, 18 or 19 and will result in a change of position of frame 11 relative to the wheels 12—15. Such a change in the relative position of the frame or sprung portion of the vehicle relative to the wheels or unsprung portion of the vehicle is effective to move the lever 24 for actuating the mechanism 22 to meter air from the reservoir 21 to the air springs or from the air springs to the atmosphere.

Figure 4:
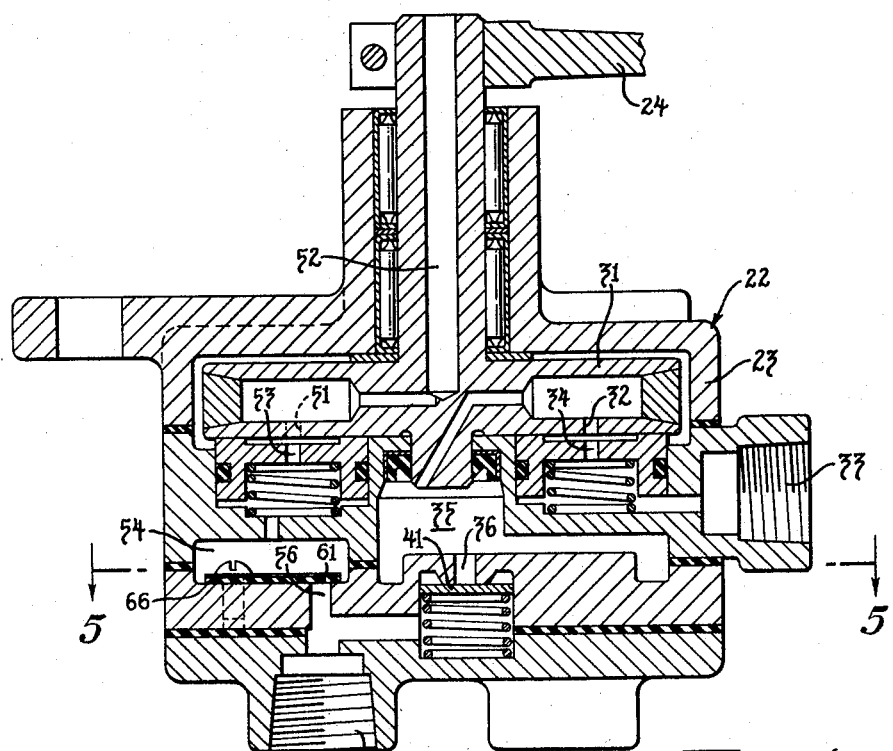
Fig. 4 is a horizontal, sectional view of the control mechanism shown in Figs. 1 and 2.
Figure 5:
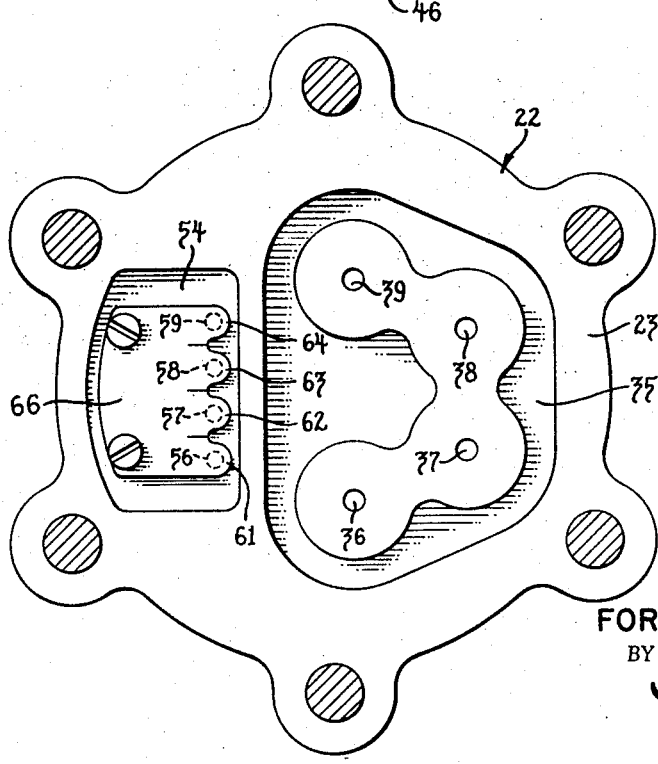
Fig. 5 is a sectional view taken generally on line 5—5 in Fig. 4.

For convenience the control mechanism and its relation to the other parts of the system will now be described with reference to Fig. 3 in which the various parts are shown diagrammatically. However, the actual construction of the control mechanism is shown in Figs. 4 and 5 and where possible like reference characters are used to designate the same parts in Figs. 3, 4 and 5.

The control mechanism includes a rotary valve member 31 having passage means 32 simultaneously alignable with a passage 33 communicating directly with the reservoir 21 and also with a passage 34 in communication with a supply chamber 35. The chamber 35 and a plurality of communicating ports 36—39 form a manifold for delivering air through check valves 41—44 to conduits 46—49 associated, respectively, with the air springs 16—19.

The rotary member 31 is also provided with passage means 51 simultaneously alignable with a port 52 communicating with the atmosphere and with a passage 53 communicating with an exhaust chamber 54. Chamber 54 and a plurality of ports 56—59 form a manifold by which air is delivered from the air springs 16—19 through passages 46—49 to check valves 61—64 to the exhaust chamber 54 and then to the atmosphere.

The portions of the passage means 32 and 51 associated with the passages 34 and 53, respectively, are spaced apart so that only one or the other of the passages 32 and 51 can be effective for the passage of air. In other words, there are three operating positions of the rotary member. As shown in Fig. 3, one of the positions places the reservoir 21 in communication with chamber 35 and at the same time closes the chamber 54 to the atmosphere. When the member 31 is rotated clockwise a slight amount, communication between the chamber 35 and the reservoir 21 and between the chamber 54 and the atmosphere is interrupted. The rotary member 31 normally dwells in this neutral position in which both the supply chamber 35 and the exhaust chamber 54 are closed to the passage of air. A third position of the rotary member 31 is obtained when the passage 51 aligns with the passage 53 to place the exhaust chamber 54 in communication with the atmosphere. In this position the passage 32 remains out of alignment with the passage 34 and communication between the reservoir 21 and the chamber 35 remains interrupted.

In terms of load on the vehicle, clockwise movement of the member 31 as seen in Fig. 3 is effected upon a reduction in load. This permits one or more of the air springs 16—19 to expand and raise the frame 11 relative to the wheels 12—15. Since the drive shaft housing 27 remains almost stationary with respect to the wheels, the link 26 is effective to cause clockwise movement of the arm 24. In like manner, an increase in load on the vehicle frame will cause a deflection of the air springs, resulting in a counterclockwise rotation of the member 31.

Referring now to Figs. 4 and 5, the various parts are illustrated in substantially the same form as in Fig. 3. However, the check valves 61—64 are formed by a single element 66 made of resilient material. The tabs forming the check valves 61—64 are formed along one edge of the element 66 and are free to move independently of each other.

Although the control mechanism is actuated as the vehicle travels over rough roads, its operation will be considered first from the standpoint of an unoccupied, parked vehicle, having its motor running and its air springs at equal pressures. Under such conditions, the rotary valve member 31 will dwell in its neutral position.

As soon as the passenger seats himself in the vehicle, the air springs on that side of the vehicle will deflect due to the increased load and, as a consequence, the air pressures in the deflected air springs will increase. At the same time, the deflected springs will permit the frame to move downwardly relative to the wheels so that the valve opens to supply the chamber 35 with air. The pressure of the air supplied to chamber 35 will unseat one or more of the check valves 41—44 associated with the air springs having the lowest pressure. As the pressure in the low pressure springs increases and becomes equal to the next lowest pressure, the check valve associated with that particular air spring will also open to permit delivery of air. This will become readily apparent by considering actual pressures which might be encountered when a passenger enters or leaves the parked vehicle. For example, as seen in Fig. 3, if the initial air pressure in each spring is 100 p.s.i., the increased load caused by a person seating himself at the driver's side of the vehicle may increase the pressures in air spring 17 to 110 p.s.i. and in air spring 19 to 115 p.s.i., while pressures in the springs 16 and 18 remain at 100 p.s.i. If the air supply pressure is at 200 p.s.i., movement of valve member 31 to an air supply position causes air to flow into chamber 35. Check valves 41 and 43 will open due to the pressure differential between the chamber 35 and the associated springs 16 and 18 to permit delivery of air until the pressures increase to 110 p.s.i. At this pressure, check valve 42 will open and air will be supplied simultaneously to springs 16, 17 and 18 until their pressures reach 115 p.s.i. Thereafter, all of the check valves 41—44 will open and the supply of air will continue to all of the air springs until valve 31 returns to neutral.

After the valve 31 returns to neutral, it is quite possible that the pressures in each of the air springs will be at 120 p.s.i. Under such conditions the rates of all the springs are equal and the rates have all been increased to reflect the increase in load caused by a person occupying the vehicle. If the passenger should leave the parked vehicle at this point, the springs 17 and 19 will extend due to the decreased load. As an example, the pressures in springs 16—19 may have values of 120 p.s.i., 115 p.s.i., 120 p.s.i. and 110 p.s.i., respectively. However, as the passenger leaves his seat, the valve 31 will be moved to its exhaust position and valves 61 and 63 will open first to exhaust air to the atmosphere. When the pressure in air springs 16 and 18 drops to 115 p.s.i., the valve 62 will open so that air will be exhausted simultaneously from the springs 16, 17 and 18 until their pressures drop to 110 p.s.i. At this point, valve 64 will open so that air will be exhausted simultaneously from all air springs until the frame 11 drops to its unloaded position and causes the valve 31 to return to its neutral position.

Under the conditions described, the pressures are maintained equally in all of the air springs either when the load is distributed evenly as in an empty vehicle or when the load is unbalanced as when a single passenger is seated at one side of the vehicle. Since the rate of an air spring is a function of its pressure, the spring rates will remain equal when the load is distributed evenly or when it is unbalanced. However, the spring rates will increase equally at all springs as the load at one or more of the springs increases and the rates will decrease equally at all springs as the load at one or more of the springs decreases. By contrast, the conventional, mechanical springs now used on vehicles are of a fixed rate and do not reflect load variations.

The present system may also be contrasted to conventional, air suspension systems of the leveling type. In such systems, when a passenger enters the driver's side of a parked vehicle having 100 p.s.i. at each of the springs, the pressure in the springs 17 and 19 might increase to 110 p.s.i. and 115 p.s.i., respectively. The control mechanism associated with those springs would cause additional air to be delivered to those springs to increase the pressure even more in an attempt to level the vehicle. The resulting pressures might achieve values of 100 p.s.i., 150 p.s.i., 100 p.s.i. and 150 p.s.i. at the springs 16—19, respectively. Under such conditions, the vehicle would be level or evenly spaced from its wheels but the spring rates would vary substantially and if the same condition were to hold as the vehicle moved on the road, the results would be undesirable and perhaps hazardous.

It is believed that it is far more desirable to maintain equal spring rates than it is to maintain a level vehicle frame. Since the character of air springs is such that each unit of increased pressure results in a diminishing increment of deflection, the unbalanced condition of a frame relative to its wheels is less critical than in the case of mechanical springs and as a matter of fact is so small that it usually can not be detected.

Thus far the system has been considered from the standpoint of a parked vehicle with both balanced and unbalanced loads. The operation of the vehicle is generally similar when it is being operated on the highway. Minor undulations in the road surface will cause minor deflections of the springs. Most of the deflections will be of such a small value that the valve 31 will dwell in the area of its neutral position so that air is neither supplied to nor exhausted from the air springs 16—19. If a bump causes a servere deflection of one of the springs, the associated wheel will move upwardly relative to the frame 11 and then return to its normal position. This will cause the frame to move and will result in movement of the valve 31 from its neutral position to a supply position as seen in Fig. 3. Almost instantaneously, the valve will return to its neutral position and in the short interval that it is open, air will be supplied to the chamber 35. The charge of high pressure air in the chamber 35 will be effective to open all of the check valves 41—44 if the pressure in the springs 16—19 are equal so that all of the pressures are increased slightly. However, if one or more of the springs is at a low pressure, the charge of air will be supplied to those springs. Subsequent charges of air will be delivered to the spring with the next lowest pressure and eventually the pressures in all of the springs are made equal. Thereafter, charges of air will be delivered equally to all springs. In other words, air is supplied to one or more air springs at the lowest pressure and, subsequently, to the other springs in the order of their ascending pressures until all springs are at the same pressure. Thereafter air will be supplied simultaneously to all springs. Air is exhausted from the springs in much the same manner, that is, excessive, rapid deflections will permit exhaust of air in small charges from the high pressure springs first and, subsequently, from the other springs in the order of descending pressures until the pressures are equal. Thereafter air will exhaust simultaneously from all springs to maintain equal pressures. In both the supply and exhaust conditions of the valve, the tendency will be to equalize the pressures in the air springs at some predetermined value corresponding to the relative position of the vehicle body and wheels.

In the mechanism employed in the disclosed embodiment of the invention the sequence of operation of the supply check valves in the order of ascending pressures and the exhaust check valves in the order of descending pressures is facilitated by making the supply port 34 and the exhaust port 53 relatively smaller than the check valve ports 36—39 and 56—59, respectively. For example, the exhaust port 53 is smaller than ports 56—59 so that air will exhaust from chamber 54 more slowly than it will be supplied to chamber 54 by the air springs 16—19. In terms of actual pressures, if the springs 16, 17 and 18 are equal at 100 p.s.i. and the pressure in spring 19 equals 150 p.s.i. the pressure in chamber 54 will also equal 150 p.s.i. This pressure is effective to hold check valves 61, 62 and 63 closed and will permit check valve 64 to remain in a balanced condition with equal pressures at opposite sides. When the exhaust port 53 is open to the atmosphere the pressure in chamber 54 will drop and check valve 64 will open to exhaust air rapidly from the spring 19. Since port 53 is smaller than port 59 air flow through port 59 will be effective to maintain check valves 56—58 closed. If port 53 is equal to or larger than the check valve ports 56—59, exhaust of air from chamber 54 might be so rapid that a large pressure differential would be created at each of the check valves so that they would open simultaneously even though the pressures in the springs 16—18 are lower than the pressure in spring 19.

The check valves 41—44 associated with the supply chamber 35 operate in much the same manner as the exhaust valves by reason of the port 34 which is made relatively smaller than the check valve ports 36—39.

Besides controlling the distribution of air supply and exhaust, the check valves 41—44 and 61—64 prevent interchange of air between air springs. This is of particular importance in maintaining equal spring rates when various shock loads are encountered. For example, a severe bump causing a deflection of one of the springs would greatly increase the pressure in that particular spring. However, check valves 41—44 would prevent the flow of air to chamber 35 or to any of the lower pressure springs. With the control valve 31 in its neutral position, only the check valve 61, 62, 63 or 64 associated with the high pressure spring would open to charge the chamber 54 with air under pressure. This pressure would hold the remaining check valves closed and air would be exhausted from the chamber 54 when the control valve 31 moves to its exhaust position.

Under the same circumstances, conventional, air suspension systems of the leveling type would supply a great quantity of air to the spring which was severely deflected. Since the deflection would ordinarily exist for only an instant, the frame would assume an unbalanced position and the control valve associated with that spring would move to exhaust air to the atmosphere. It will readily be seen that if a series of severe deflections where encountered in a short period of time, a great quantity of air would be wasted. Furthermore, a great variation would occur in the spring rates at the various wheels which could be of a hazardous nature, if the variations existed at a time when the control of the vehicle was critical.

Even in a parked condition of a vehicle the disclosed suspension system has distinct advantages over leveling type systems. For example, if one of the rear wheels of a vehicle should roll up on a street curb, the front wheels will cause the frame to twist and to move the body relative to the rear axle. In the leveling type system the control mechanism will cause air to be supplied to the air spring associated with the wheel on the curb so that the body will be leveled relative to the rear axle. Under these conditions the body assumes an exaggerated tilt relative to the surface of the street and puts an undesirable twist on the vehicle frame due to the front wheels which are positioned on the surface of the street. In the presently described system, however, the twist of the frame resulting from one wheel positioned on a street curb would cause an increased load at that wheel and the single control mechanism would be actuated to increase the pressure slightly at all of the wheels. The body would assume a slightly tilted position intermediate the front and rear axles, that is, intermediate a position level with the street and a position level with the rear axle.

From the preceding description, it will be apparent that the present air suspension system is one in which the spring rates of a number of the springs on the same vehicle may be maintained equally and may be increased with an increase in load, whether that load is balanced or unbalanced, by a control means which is responsive to deflections in the springs at either side of the vehicle and which admits air to the springs in the order of increasing values of pressure and exhausts air from the springs in the order of decreasing values of pressure for the purpose of maintaining equal or nearly equal pressures in the springs.

It should be understood that there is no intention to limit the invention to the above described forms and details and that the invention includes other forms and modifications which may be embraced by the scope of the appended claims.

It is claimed and desired to secure by Letters Patent:

1. In a fluid suspension system including load supporting fluid containers disposed at spaced points between a load supporting structure and wheel supporting structures of a vehicle, means tending to equalize the pressures in said containers in response to relative movement of said structures including a supply chamber and a discharge chamber, passage means between each one of said containers and said chambers, first distributor valve means disposed in said passages and operative to deliver a supply of fluid to said containers in response to a pressure differential between each container and said supply chamber, second distributor valve means disposed in said passages and operative to exhaust fluid from said containers in response to a pressure differential between each container and said discharge chamber, and valve means continuously responsive to changes in relative positions of said structures and movable between a position admitting fluid to said supply chamber while maintaining said exhaust chamber closed and a position exhausting fluid from said discharge chamber while maintaining said supply chamber closed.

2. In a vehicle having deformable, load supporting means in the form of fluid containing springs interposed between sprung and unsprung masses of the vehicle at opposite sides thereof and a source of fluid under pressure for said springs, the combination of control means having a supply chamber, separate conduits communicating with said supply chamber and with said suspension means on each side of said vehicle, respectively, one-way check valve means operatively associated with each of said conduits and movable to permit fluid flow from said supply chamber to said support means, a discharge chamber in fluid communication with said conduits, one-way check valve means associated with each of said conduits and movable to permit fluid flow from said support means to said discharge chamber, control valve means movable between positions permitting fluid delivery from said source to said supply chamber and positions permitting fluid exhaust from said discharge chamber, said supply and discharge chambers being closed to each other for all positions of said control valve means, and operating means connected to said control valve means for moving the latter in response to all changes in relative positions between the sprung and unsprung masses of the vehicle.

3. In a fluid suspension system including load supporting fluid containers disposed at spaced points between a load supporting structure and wheel supporting structures of a vehicle, means tending to equalize the pressures in said containers in response to relative movement of said structures including a supply chamber and a discharge chamber isolated from each other, passage means connecting each one of said containers with both of said chambers, first distributor valve means disposed in said passages and operative to permit fluid delivery from said supply chamber first to those containers having the lowest pressure and to all containers equally when the pressures therein are equal in response to an increase in pressure in said supply chamber, second distributor valve means disposed in said passages and operative to permit exhaust of fluid from said containers first from those containers having the highest pressure and from all containers equally when the pressures therein are equal in response to a reduction of pressure in said discharge chamber, a source of fluid under pressure connected to said supply chamber, and valve means operatively associated with said source and with said discharge and supply chambers and being movable in opposite directions for increasing the pressure of the fluid in said supply chamber and for decreasing the pressure of fluid in said discharge chamber, respectively, and operating means movable in response to all changes in position between said structures to continuously move said valve means in one or the other of said directions.

4. In a vehicle having deformable, load supporting means in the form of fluid containing springs interposed between sprung and unsprung masses of the vehicle at opposite sides thereof and a source of fluid under pressure for said springs, the combination of control means having a supply chamber, separate conduits communicating with said supply chamber and with said springs on each side of said vehicle, respectively, one-way check valve means operatively associated with each of said conduits and said supply chamber to permit fluid flow from said supply chamber to said springs, a discharge chamber in fluid communication with said conduits, one-way check valve means associated with each of said conduits and said exhaust chamber and permitting fluid flow from said springs to said exhaust chamber, valve means movable between positions permitting fluid delivery to said supply chamber and positions permitting fluid discharge from said exhaust chamber, said supply and discharge chambers being closed to each other for all positions of said valve means, and operating means connected to said valve means and to one of said masses of said vehicle intermediate said load support means for moving said valve means in response to all deformations of said springs.

5. In a suspension system for a vehicle including a plurality of fluid springs containing fluid under pressure and interposed between the wheels and a load supporting structure, the combinatiton of a continuous source of fluid under pressure, means including a supply chamber and a discharge chamber for receiving fluid under pressure and for exhausting fluid under pressure, respectively, separate passage means for each of said springs communicating with said supply and discharge chambers, multiple valve means associated with said supply chamber and each of said passages to prevent flow of fluid from said springs to said supply chamber and being operative in response to a supply of fluid to said supply chamber to admit fluid to said springs in the order of ascending values of pressure and simultaneously to all springs when fluid pressures therein are equal, additional multiple valve means associated with said discharge chamber and each of said passages to prevent flow of fluid from said discharge chamber to said springs and being operative in response to an exhaust of fluid from said discharge chamber to exhaust fluid from said springs in the order of descending values of pressure and simultaneously from all springs when the pressures therein are equal, a movable valve element operative in one position to admit fluid to said supply chamber and operative in another position to exhaust fluid from said discharge chamber, said supply and discharge chambers being isolated from each other for all positions of said valve element, and operating means operatively connected with said valve element and connected to one of said supporting structures for movement in response to all changes in the relative positions between said structures to correspondingly move said valve element.

6. In an air spring suspension system for vehicles including a plurality of load supporting air containers interposed between sprung and unsprung masses of the vehicle, a control mechanism including a supply chamber and a discharge chamber, separate passage means each operatively connected to both of said chambers and to each of said air containers, respectively, first means associated with each of said passages for preventing the flow of air from said supply chamber simultaneously to all air containers until the pressures therein are equal and permitting the flow of air to those containers at the lowest pressure upon a supply of air to said supply chamber, second means associated with each of said passages for preventing the exhaust of air simultaneously from all containers to said discharge chamber until the pressures therein are equal and permitting the exhaust of air from those containers with the lowest pressure upon exhaust of air from said discharge chamber, a continuous source of air under pressure, and valve means movable to control the supply of air from said source to said supply chamber and the exhaust of air from said discharge chamber to the atmosphere in response to all changes in position between said sprung and unsprung masses, said supply and exhaust chambers being isolated from each other for all positions of said valve means.

7. In a pneumatic air suspension system including a plurality of load supporting air containers disposed between sprung and unsprung portions of a vehicle, the combination of, valve means including a supply chamber in communication with said containers, a discharge chamber in communication with said containers, a plurality of one-way valve means operatively associated with each of said containers for permitting delivery of air from said supply chamber to said containers and preventing exhaust of air from said containers to said discharge chamber, a plurality of auxiliary one-way valve means operatively associated with each of said containers and permitting the exhaust of air from said containers to said discharge chamber and preventing the delivery of air from said supply chamber to said containers, a first pair of ports communicating with said supply and exhaust chambers, respectively, a control member positioned for movement adjacent said first pair of ports and forming a second pair of control ports spaced apart a distance other than the distance between said ports of said first pair, said control member being movable in opposite directions from a neutral position in which both of said first pair of ports are closed by said control member to a position in which one port of each pair are in alignment with each other to place said discharge chamber in communication with the atmosphere and to a position in which the other port of each pair of ports are aligned to place said supply chamber in communication with a source of air pressure, said supply and exhaust chamber being isolated from each other for all positions of said control member and means for moving said control member in response to all changes in the spacing between sprung and unsprung portions of the vehicle.

8. In an air suspension system for a vehicle having a supply of air under pressure, the combination of air containing spring means disposed at opposite sides of the vehicle and between sprung and unsprung portions thereof, control means including a supply and an exhaust chamber continuously isolated from each other, valve means communicating with said chambers and normally disposed in a neutral position to prevent air flow to and from said chambers, said valve means being movable in opposite directions from said neutral position to permit delivery of air to said supply chamber and to permit exhaust of air from said discharge chamber, respectively, means connected to said valve means and to one of said portions of the vehicle at a point intermediate opposite sides of the vehicle and being responsive to relative movement of said sprung and unsprung portions of said vehicle to move said valve means, multiple one-way check valve means associated with said supply chamber and operable in response to a supply of air to said supply chamber to deliver air first to the air springs having the lowest pressure and eventually to all air springs when the pressures therein are equal, and additional multiple one-way check valve means associated with said exhaust chamber and operative upon a discharge of air to the atmosphere to permit air flow from said spring means to said exhaust chamber first from the spring means having the highest pressure and eventually from all spring means when the pressures therein have decreased to an equal value.

9. In a control mechanism for controlling the distribution of fluid under pressure to and from fluid containing springs disposed at opposite sides of a vehicle and interposed between sprung and unsprung portions of the vehicle, said control mechanism comprising a fluid supply manifold for distributing fluid from a source of supply to said springs, a fluid exhaust manifold for conveying air from said springs to the atmosphere, valve means having a neutral position preventing communication of said supply manifold with said source of supply and said exhaust manifold with the atmosphere and being movable in a first direction to place said supply manifold in communication with said source of supply and in a second direction to place said exhaust manifold in communication with the atmosphere while maintaining said exhaust manifold isolated from said supply manifold, operating means for moving said valve means adapted for operative connection to one of said portions of the vehicle for moving said valve means in response to all relative movement of said sprung and unsprung portions, check valve means operatively associated with said supply manifold and each of said fluid springs to permit fluid flow in one direction, first to the springs having the lowest pressure and eventually to all springs when their pressures are equal, and additional check valve means disposed in said exhaust manifold permitting said exhaust manifold to receive fluid, first from springs having the highest pressure and eventually from all springs when the pressures therein are equal.

10. In a vehicle having a ground engaging structure and a load supporting structure supported relative to each other by a plurality of deformable air springs; a source of air under pressure; multiple supply valve means connected in air communication with said source and with all of said air springs and being responsive to a supply of air from said source to supply air to one of said springs at the lowest pressure, to all other springs having the same pressure as said one spring and to all of said springs when the pressures therein are equal; multiple discharge valve means communicating with the atmosphere and each of said springs and being responsive to an exhaust of air from said discharge valve means to the atmosphere to exhaust air to said discharge chamber from one of said springs at the highest pressure, from all other springs having the same high pressure and from all of said springs when the pressures therein are equal; control valve means in air communication with said multiple valve means and having a body member supported on one of said structures, said control valve means including an actuator element movable between positions permitting supply of air from said source to said multiple supply valve means and exhaust of air from said multiple discharge valve means solely to the atmosphere; and operating means connected to said actuator element and to the other of said structures at a point disposed between said air springs to correspondingly move said actuator element in response to all deformation of one or more of said air springs.

11. In an air suspension system for a vehicle having a load carrying structure suspended relative to a ground engaging structure supporting front and rear pairs of wheels by means of a plurality of deformable air springs associated with each of said wheels, a source of air under pressure, means for controlling the flow of air from said source to said air springs and from the latter to the atmosphere in response to relative movement of said structures, said means comprising a housing member supported on said load carrying structure, a supply chamber and discharge chamber formed in said housing, a valve element associated with said chambers and being movable in opposite directions from a position preventing flow of air to or from said chambers, said valve element being movable in one direction to admit air to said supply chamber and in another direction to exhaust air from said discharge chamber, operating means for moving said valve element connected to the latter and to said ground engaging structure at a point midway of said air springs at opposite sides of the vehicle and between said front and rear axle structures for movement in response to deformation of one or more of said air springs, a plurality of passage means associated with each spring, respectively, each of said passage means being connected with said supply chamber and said discharge chamber, and pairs of check valves associated with each of said passage means, respectively, one check valve of each pair being operatively connected to said supply chamber and the other of said check valves being operatively connected to said discharge chamber, said check valves associated with said supply chamber being movable to admit air from said supply chamber to said springs in the order of increasing values of pressure in said springs and simultaneously to all springs when the pressures therein are equal, said check valves associated with said discharge chamber being movable to admit fluid from said air springs to said discharge chamber in the order of decreasing values of pressure in said springs and simultaneously from all springs when the pressures therein are equal.

References Cited in the file of this patent

UNITED STATES PATENTS

| | | |
|---|---|---|
| 2,427,927 | Schutte | Sept. 23, 1947 |
| 2,809,051 | Jackson | Oct. 8, 1957 |